United States Patent

[11] 3,630,252

| [72] | Inventors | Jose Rosan, Sr.<br>San Juan Capistrano;<br>Jose Rosan, Jr., Newport Beach, both of Calif. |
|---|---|---|
| [21] | Appl. No. | 32,081 |
| [22] | Filed | Apr. 27, 1970 |
| [45] | Patented | Dec. 28, 1971 |
| [73] | Assignee | Rosan Engineering Corp.<br>Newport, Calif.<br>by said Jose Rosan, Jr. |

[54] STUD FASTENER ASSEMBLY WITH INTEGRAL LOCKRING
6 Claims, 6 Drawing Figs.

[52] U.S. Cl. ........................................ 151/41.73,
 151/8, 151/54, 10/27
[51] Int. Cl. ............................................... F16b 39/02
[50] Field of Search............................................ 151/41.73,
 8, 54, 55; 285/92, 23

[56] References Cited
UNITED STATES PATENTS

| 769,199 | 9/1904 | Tower ........................ | 151/68 |
| 2,400,348 | 5/1946 | Greene........................ | 151/41.73 |
| 2,788,830 | 4/1957 | Rosan.......................... | 151/41.73 |
| 3,215,183 | 11/1965 | Dietlein....................... | 151/41.73 |
| 3,259,161 | 7/1966 | Rosan.......................... | 151/41.73 |
| 3,259,163 | 7/1966 | Rosan.......................... | 151/41.73 |

FOREIGN PATENTS

| 1,091,566 | 10/1954 | France ........................ | 151/41.73 |
| 1,516,595 | 1/1968 | France ........................ | 151/23 |

*Primary Examiner*—Marion Parsons, Jr.
*Attorney*—Roman A. Di Meo

ABSTRACT: A stud fastener assembly having both ends thereof threaded and a lockring in slidable but captive engagement between the said threaded ends so that said lockring is not disengageable therefrom and a method of making the same whereby the lockring is slipped onto the stud fastener subsequent to threading one end thereof and thereafter threading the opposite end of said fastener.

PATENTED DEC 28 1971

3,630,252

INVENTORS.
JOSÉ ROSÁN, SR.
JOSÉ ROSÁN, JR.
BY
Roman A. Dines
ATTORNEY

STUD FASTENER ASSEMBLY WITH INTEGRAL LOCKRING

With the advent of more sophisticated motors, engines and the like having speeds of high revolution and the attendant vibration problems resulting therefrom, it has become increasingly necessary to obtain extraneously installed studs capable of being locked into place without the possibility of being loosened due to the aforesaid high vibrational forces. This problem has been solved by using a lockring in conjunction with the stud to form a stud fastener assembly, said lockring being externally and internally serrated whereby the internal serrations thereof engage cooperating serrations on the stud body and the lockring. After the lockring is displaced into integral engagement with the workpiece, since its external serrations engage the workpiece material, rotation of the lockring, and a fortiori the stud, is prohibited, and concomitantly helical displacement of the fastener is also prohibited.

However, an inventory and installation problem could conceivably occur by the use of separate nointegral lockring in conjunction with the stud fastener. The instant invention anticipates and avoids this problem by maintaining the lockring in permanent limited slidable engagement with the threaded ends of the stud fastener. This is achieved as will hereinafter be more fully described by threading one end of a stud blank, placing the lockring onto the stud blank over the nonthreaded opposite end, and thereafter threading the nonthreaded end of the stud blank.

An additional important feature of this invention is that while the lockring is in slidable engagement with the stud body its longitudinal movement is limited in either direction by the threads on the stud body formed on opposite sides of the lockring. Thus, when the stud is threaded into a workpiece bore the depth of its installation will be limited by the slidable lockring contacting the bottom thread convolution of the threads of the external portion of the stud, thereby providing a positive means for installing the studs of the instant invention to a uniform depth.

Accordingly, the principal object of this invention is to provide a stud fastener assembly which can be permanently locked into a workpiece by means of a serrated lockring wherein the lockring is in captive relationship with the stud body.

Another object is to provide a stud fastener assembly which can be permanently locked into a workpiece by means of a serrated lockring wherein the lockring is captive, but in movable relationship with the stud fastener body.

Still another object is to provide a stud fastener assembly which can be permanently locked in a workpiece by means of a serrated lockring wherein the stud fastener is further provided with means for positively installing the same at a uniform depth.

Other objects and advantages will be readily apparent from the description taken in conjunction with the accompanying drawings in which.

Figure 1:
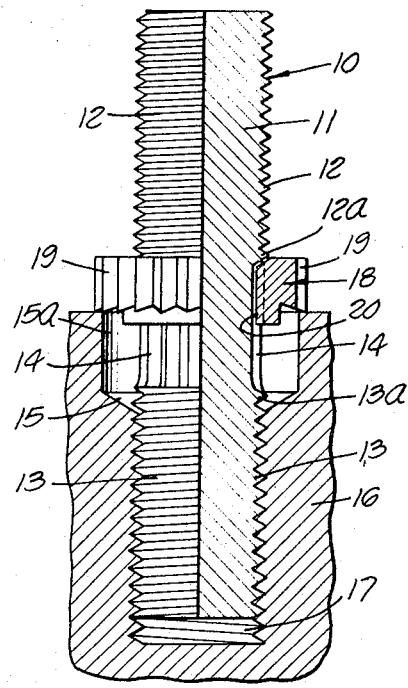
FIG. 1 is an elevational, partly sectioned, view of the stud fastener assembly of the instant invention threaded into a workpiece, but prior to displacing the serrated lockring into locking position into the workpiece material.
Figure 2:
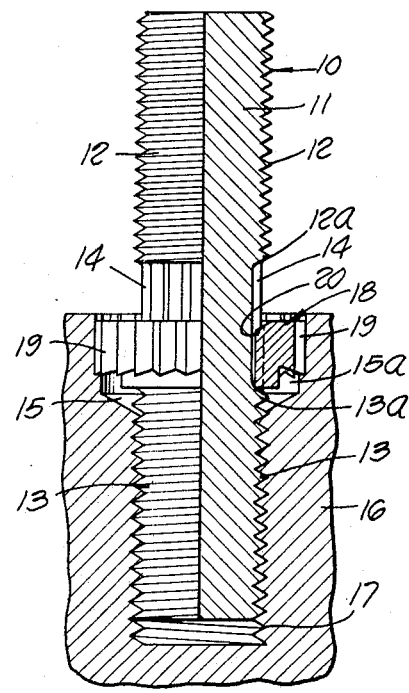
FIG. 2 is an elevational, partly sectioned, view of the stud fastener assembly shown in FIG. 1, illustrating the lockring displaced into the workpiece material in locking position.
Figure 3:
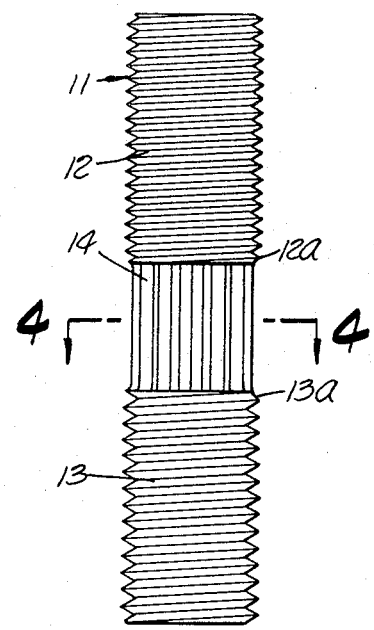
FIG. 3 is an elevational view of the stud body of the stud fastener assembly of FIG. 1.
Figure 4:
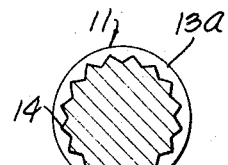
FIG. 4 is a cross-sectional view of the stud body shown in FIG. 3 taken on the line 4—4 thereof.

Referring more particularly to FIGS. 1-4, reference numeral 10 designates generally the stud fastener assembly of the invention having a body 11 provided with external threads 12 and 13. Stud body 11 is shown threaded into workpiece bore 15 of workpiece 16 and in threaded engagement with internal threads 17 or bore 15 of the workpiece. Body 11 is further provided with longitudinally extending flutes or serrations 14 interposed between the innermost thread convolutions 12a and 13a (as best seen in FIG. 3) of external threads 12 and 13, respectively. External threads 12 and 13 may be similar or different in size from each other, but in any event the minimum crest diameters of both of said thread convolutions must exceed the maximum crest diameter of the internal serrations of the lockring for reasons which will hereinafter be more particularly described.

Although not shown, an annular groove may be positioned between the uppermost end of longitudinal serrations 14 and the innermost thread convolution 12a so as to result in an area of reduced cross section, thereby providing preselected or preferential breaking or shearing points in the event of excessive torsional or shearing force applied to the stud body. This avoids a recurring problem whereby under such forces the stud body normally fractures approximately one to two thread convolutions below the point of contact of the fastener threads with the workpiece bore threads.

Figure 5:
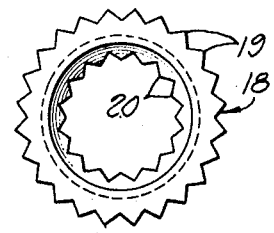
FIG. 5 is a top plan view of the lockring shown in FIG. 1.
Figure 6:
FIG. 6 is an elevational, partly sectioned view of the lockring shown in FIG. 5.

Lockring 18 is provided with external serrations 19 and internal serrations 20 (as best shown in FIGS. 5 and 6). Internal serrations 20 of lockring 18 are in slidable engagement with longitudinal serrations 14 of body 11. AS hereinabove mentioned, regardless of the size of external threads 12 and 13 of body 11, the crest diameters of both threads exceed the crest diameter of the internal serrations 20 so that although lockring 18 is afforded axial movement relative to the body 11, said movement is limited by the engagement of the upper portion of internal serrations 20 with lead thread convolution 12a and the engagement of the lower portion of internal serrations 20 with lead thread convolution 13a. It is thus evident that lockring 18 is made an integral, captive member of the stud fastener assembly.

As stud body 11 is threaded into bore 15 of workpiece 16, no interference results from the captive nature of lockring 18 since the lockring will ride axially along serrations 14 of body 11. Further, when the upper portion of internal serrations 20 abuts against thread convolution 12a, further threading of body 11 into the bore of the workpiece is resisted, thereby indicating that the stud is installed to the prescribed depth. Therefore, prior to displacing the lockring 18 into its locking position it serves the function of providing a positive stop means thereby obtaining uniform installation of the stud fastener.

After the stud fastener is threaded to its predetermined depth, an axial force is applied to the uppermost portion of the lockring 18, thereby embedding external serrations 19 thereof into the workpiece material adjacent counterbore 15a of bore 15. It is obvious that the workpiece material located between the crests of the external serrations 19 of lockring 18 provides a resistant force to subsequent rotational movement of the lockring. By virtue of the interengagement of internal serrations 20 of lockring 18 and external serrations 14 of stud body 11, rotational movement of stud body 11 is also prohibited thereby eliminating the helical displacement of stud body 11 and maintaining the stud fastener in tight integral association with the workpiece.

The fastener of the instant invention is made by first externally threading a stud blank so as to provide the external threads 13. Either concurrent therewith, or immediately subsequent thereto, external longitudinally extending serrations 14 may be formed. External threads 13 may be formed by any conventional means such as thread rolling and the like, and external serrations 14 may also be formed by any conventional method such as knurling, grinding, cutting and the like.

After the formation of external threads 13 and external serrations 14, lockring 18, upon which is formed external longitudinally extending serrations 19 and internal serations 20, is slipped over the blank end of the stud body so that internal serrations 20 interengage external serrations 14 of the body. It should be noted that external threads 13 of the body are formed so that the minimum crest diameter thereof is larger than the maximum crest diameter of the external serrations 20 of lockring 18 thereby prohibiting longitudinal disengagement of the lockring.

Thereafter, the unformed end opposite threaded portion 13 of body 11 is threaded to form external threads 12. External threads 12 are formed by a thread rolling process. Thus, although the unformed portion of body 11 over which lockring 18 is slipped must of necessity initially have a lesser diameter than the crest diameter of internal serrations 20 of lockring 18, by thread forming, the coats and crests rather than cutting the same, the material initially located thereat is caused to flow and be displaced outwardly so as to form the crest of the threads. Therefore, by use of this process, the crest diameter of the threads so formed will exceed the initial diameter of the blank shank from which it was formed. Thus, the crest of the external threads 12 are formed to have a diameter greater than the crest diameter of internal serrations 20 of the lockring.

While one embodiment of the invention has been described, it is understood that the particular embodiment of the invention herein disclosed is for illustrative purposes only and that various changes may be made therein without departing from the principles of the invention.

We claim:

1. A stud fastener assembly for installation in workpiece bores, comprising:
  a cylindrical body, said body provided with external threads and external longitudinally extending serrations positioned on said body between the said external threads of said body; and
  a lockring provided with external longitudinally extending serrations having crest and roots and internal longitudinally extending serrations also having crests and roots, the latter being interengaged with the external serrations provided by said body, the maximum diameter of the crests of said internal serrations provided by the lockring being less than the minimum diameter across the crests of the external threads provided by said body.

2. A stud fastener assembly as defined in claim 1, herein the external threads are positioned at opposite ends of the body and the external serrations provided by said body are positioned therebetween.

3. A stud fastener assembly as defined in claim 2, wherein the maximum diameter across the external longitudinal extending serrations positioned on the body between the external threads are less than the minumum diameter of the crests of said external threads.

4. A stud fastener assembly as defined in claim 2, wherein the external serrations of the body extend to the lead convolution of one one of said threads provided by said body.

5. A stud fastener assembly as defined in claim 4, wherein aid external serrations provided by said body extend to the lead convolution of the upper threads of said body.

6. A stud fastener assembly as described in claim 4, wherein the external serrations provided by said body extend to the lead convolution of both threaded portions of said body.

* * * * *